US012682835B2

(12) United States Patent
Hwang et al.

(10) Patent No.: US 12,682,835 B2
(45) Date of Patent: Jul. 14, 2026

(54) GATE DRIVING CIRCUIT AND DISPLAY APPARATUS INCLUDING THE SAME

(71) Applicant: LG Display Co., Ltd., Seoul (KR)

(72) Inventors: Sujin Hwang, Paju-si (KR); Miyoung Son, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/981,380

(22) Filed: Dec. 13, 2024

(65) Prior Publication Data

US 2025/0279040 A1 Sep. 4, 2025

(30) Foreign Application Priority Data

Feb. 29, 2024 (KR) ........................ 10-2024-0029691

(51) Int. Cl.
*G09G 3/32* (2016.01)

(52) U.S. Cl.
CPC ....... *G09G 3/32* (2013.01); *G09G 2300/0408* (2013.01); *G09G 2300/0426* (2013.01); *G09G 2300/0842* (2013.01); *G09G 2310/0267* (2013.01); *G09G 2310/0286* (2013.01)

(58) Field of Classification Search
None
See application file for complete search history.

(56) References Cited

U.S. PATENT DOCUMENTS

| | | | | |
|---|---|---|---|---|
| 9,704,429 | B2 | 7/2017 | Seo et al. | |
| 11,574,599 | B2 | 2/2023 | No et al. | |
| 11,900,861 | B2 | 2/2024 | Kim et al. | |
| 2016/0267831 | A1 | 9/2016 | Seo et al. | |
| 2018/0138256 | A1* | 5/2018 | Han | H10K 59/1213 |
| 2022/0139335 | A1* | 5/2022 | Lee | G09G 3/3233 |
| 2022/0375401 | A1* | 11/2022 | Kim | G09G 3/2085 |
| 2022/0383821 | A1 | 12/2022 | No et al. | |
| 2024/0087510 | A1 | 3/2024 | Kim et al. | |

FOREIGN PATENT DOCUMENTS

| | | | |
|---|---|---|---|
| KR | 10-2016-0110840 | A | 9/2016 |
| KR | 10-2021-0076761 | A | 6/2021 |
| KR | 10-2022-0161602 | A | 12/2022 |

* cited by examiner

*Primary Examiner* — Christopher J Kohlman
(74) *Attorney, Agent, or Firm* — Fenwick & West LLP

(57) ABSTRACT

A micro-LED display apparatus presented herein is capable of efficiently using the output of a timing controller. Power consumption of the micro-LED display apparatus can be reduced by efficiently using the output of the timing controller.

8 Claims, 12 Drawing Sheets

GATE DRIVING CIRCUIT AND DISPLAY APPARATUS INCLUDING THE SAME

CROSS REFERENCE TO RELATED APPLICATION

This application claims priority from Republic of Korea Patent Application No. 10-2024-0029691, filed on Feb. 29, 2024, which is hereby incorporated by reference in its entirety.

BACKGROUND

Field

The present disclosure relates to a display apparatus, and more specifically, to a gate driving circuit and a micro-LED display apparatus including the same.

Description of Related Art

Recently, as society advances to the information-oriented society, the field of display apparatuses which visually express an electrical information signal is rapidly advancing. Various display apparatuses, having excellent performance in terms of thinness, lightness, and low power consumption, are being developed correspondingly.

Specific examples of display apparatuses include liquid crystal display apparatus (LCD), organic light emitting display Apparatus (OLED), quantum dot display apparatus, micro light emitting display apparatus (uLED), etc.

Such a display apparatus uses a timing controller, a data driver, a gate driver circuit, and a display panel for its operation.

SUMMARY

As a display apparatus becomes thinner, a technology for embedding a gate driving circuit in a display panel is being developed. The gate driving circuit built into such a display panel is known as a gate in panel (GIP) circuit and a gate in array (a gate in active, a gate in active area, a gate in pixel area, a gate in pixel array, GIA) circuit.

The GIA circuit of a micro-LED (uLED) display apparatus is built into the display panel along with the pixel array. An object to be achieved by the present disclosure is to stably drive at least one gate driver within the GIA circuit.

A micro-LED display apparatus according to one or more embodiments of the present disclosure may comprise a timing controller configured to output image data, a display panel including a plurality of pixel arrays that are connected to a data line, and a data driver configured to generate a data voltage based on the image data and apply the data voltage to the data line, wherein a pixel array of the plurality of pixel arrays may comprise a gate in array (GIA) circuit that provides a scan signal to a subpixel of the pixel array, wherein the GIA circuit may comprise a first transistor including a gate electrode connected to a QB node of the GIA circuit, a source electrode that receives a gate high voltage, and a drain electrode that receives a N-th carry signal, and a second transistor including a gate electrode connected to a Q node of the GIA circuit, a source electrode that receives the N-th carry signal, and a drain electrode that receives an N-th carry clock signal.

The display panel may include a first GIA region, a second GIA region, and a third GIA region.

The GIA circuit may comprise a first gate driver configured to provide a first scan signal to the subpixel, and a second gate driver configured to provide a second scan signal to the subpixel.

The first gate driver and second gate driver may further comprise a third transistor including a gate electrode connected to the QB node, a source electrode that receives the gate high voltage, and a drain electrode that receives an N-th scan signal, and a fourth transistor including a gate electrode connected to the Q node, a source electrode that receives the N-th scan signal, and a drain electrode that receives an N-th clock signal.

The first gate driver and second gate driver may further comprise a capacitor that receives the N-th scan signal and is connected to the Q node.

The N-th carry signal may be the same as the N-th scan signal, and the N-th carry clock signal may be the same as the N-th clock signal.

A pulse width of the second scan signal may be shorter than a pulse width of the first scan signal, a pulse width of a data voltage signal representing the data voltage may be longer than the pulse width of the first scan signal.

A gate driving circuit according to one or more embodiments of the present disclosure may comprise a gate in array (GIA) circuit configured to provide a scan signal to a subpixel, wherein the GIA circuit may comprise a first transistor including a gate electrode connected to a QB node of the GIA circuit, a source electrode that receives a gate high voltage, and a drain electrode that receives a N-th carry signal, and a second transistor including a gate electrode connected to a Q node of the GIA circuit, a source electrode that receives the N-th carry signal, and a drain electrode that receives an N-th carry clock signal.

The GIA circuit may be on a first GIA region, second GIA region, and third GIA region of a display panel.

The GIA circuit may comprise a first gate driver configured to provide a first scan signal to the subpixel, and a second gate driver configured to provide a second scan signal to the subpixel.

The first gate driver and second gate driver may further comprise a third transistor including a gate electrode connected to the QB node, a source electrode that receives the gate high voltage, and a drain electrode that receives an N-th scan signal, and a fourth transistor including a gate electrode connected to the Q node, a source electrode that receives the N-th scan signal, and a drain electrode that receives an N-th clock signal.

The first gate driver and second gate driver may further comprise a capacitor that receives the N-th scan signal and is connected to the Q node.

The N-th carry signal may be the same as the N-th scan signal, the N-th carry clock signal may be the same as the N-th clock signal.

A pulse width of the second scan signal may be shorter than a pulse width of the first scan signal, a pulse width of a data voltage signal representing the data voltage may be longer than the pulse width of the first scan signal.

DETAILED DESCRIPTION

Figure 1:
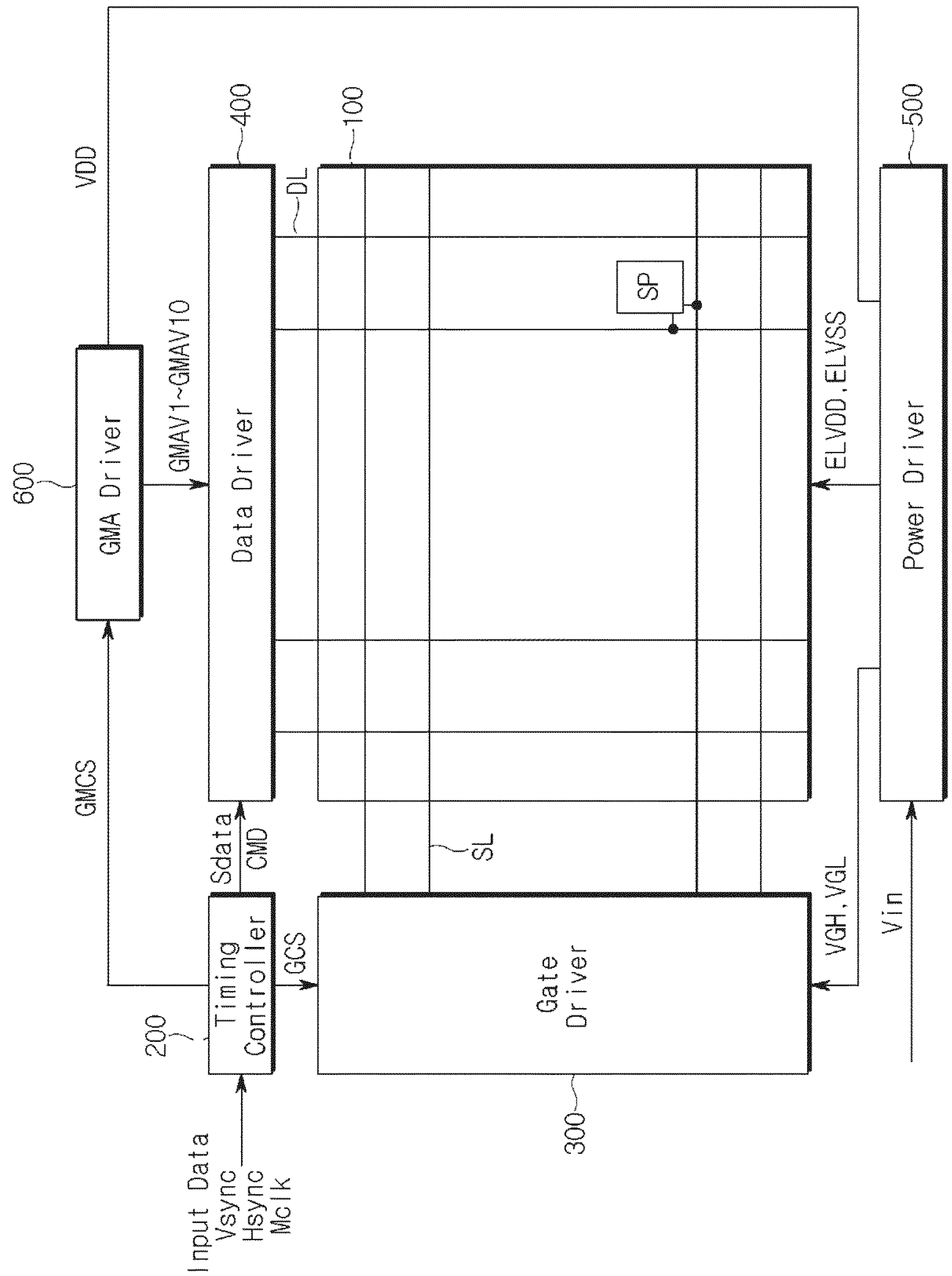
FIG. 1 is a block diagram showing a display apparatus according to embodiments of the present disclosure.

Advantages and features of the present disclosure and methods for achieving the advantages and features may become apparent from the embodiments to be hereinafter described in conjunction with the drawings. However, the present disclosure is not limited to the embodiments and may be embodied in various modifications. The embodiments are provided merely to fully disclose the present disclosure and advise those skilled in the art of the category of the disclosure. The present disclosure is defined by the appending claims.

The shapes, sizes, ratios, angles, numbers and the like disclosed in the drawings for explaining embodiments of the present disclosure are exemplary and the embodiments of the present disclosure are not limited thereto. Like reference numerals refer to substantially like elements throughout the specification. In addition, in the following description of the embodiments, a detailed description of known related arts will be omitted when it is determined that the gist of the embodiments may be unnecessarily obscured.

In the case where the terms "comprises," "includes," "having," "done," etc., are used in this specification, other parts may be added unless "only" is used. As used herein, the singular forms are intended to include the plural forms as well, unless the context clearly indicates otherwise.

In interpreting the constituent elements, it is construed to include the error range even if there is no separate description.

In the case of a description of the positional relationship, for example, if the positional relationship between two parts is described as "on," "above," "under," or "next to", one or more other parts may be located between the two parts unless "immediately" or "directly" is used.

The terms "first", "second", etc. may be used to distinguish various components. However, functions or structures of the components are not limited by names of the components and ordinal numbers prefixed to the component names.

The following embodiments of the present disclosure can be partially combined or entirely combined with each other, and can be technically interlocking-driven in various ways. The embodiments can be independently implemented, or can be implemented in conjunction with each other.

Hereinafter, various embodiments of the present disclosure will be described in detail with reference to the accompanying drawings. In the following embodiments, a display apparatus will be described for a micro-LED (uLED), but the present disclosure is not limited thereto.

FIG. 1 is a block diagram showing a display apparatus according to embodiments of the present disclosure.

Referring to FIG. 1, a display apparatus according to embodiments of the present disclosure may include a display panel 100, a timing controller 200, a gate driver 300, a data driver 400, a power driver 500, and a gamma driver 600.

The display panel 100 includes a pixel array that displays an input image on a screen. The pixel array may include a plurality of data lines DL, a plurality of scan lines SL crossing the data lines DL, and subpixels SP arranged in a matrix form.

The display panel 100 may be implemented as a non-transmissive display panel or a transmissive display panel. The display panel 100 may be manufactured as a flexible display panel. The flexible display panel may be implemented as a micro-LED (uLED) using a plastic substrate.

The timing controller 200 may receive digital image data Data of an input image and timing signals Vsync, Hsync, Clk synchronized therewith from a set system. The image data Data in digital form is a data signal of a differential signal and may be serial data. The timing signal may include a vertical synchronization signal Vsync, a horizontal synchronization signal Hsync, and a clock Clk. The set system may include a television, a monitor, a set-top box, a navigation system, a personal computer, a home theater system, a mobile device, a wearable device, a vehicle systems, etc.

The timing controller 200 may control the operation timing of the display panel 100 according to an input frequency. The input frequency may be 60 Hz in the National Television Standards Committee (NTSC) format. Recently, display apparatus that operate at a higher frequency of 120 Hz have become popular. Additionally, a display apparatus that operates at 120 Hz may be temporarily controlled to operate at 60 Hz in some cases. Additionally, recently, display apparatuses that support variable refresh rate (VRR), which operate by lowering the frame frequency to between 1 Hz and 30 Hz in a low-speed driving mode and increasing the frame frequency to 144 Hz in high-resolution video (e.g., gaming mode), are also being developed.

The timing controller 200 may output serial image data Sdata provided to the data driver 400, command data CMD for controlling the data driver 400, a gate control signal GCS for controlling the gate driver 300, and a gamma control signal GMCS for controlling the gamma driver 600, on the basis of the received timing signals Vsync, Hsync, Clk.

The gate driver 300 may be implemented as a gate driving circuit such as a Gate In Panel (GIP) circuit or a Gate In Array (GIA) circuit formed directly on the display panel 100 along with the TFT array and wiring of the pixel array. The gate driver 300 may sequentially output gate signals to the scan lines SL under the control of the timing controller 200. The gate driver 300 may sequentially output the signals to a plurality of scan lines SL by shifting the gate signal using a shift register.

The data driver 400 may use the gamma reference voltages GMAV1 to GMAV10 provided from a digital-to-analog converter (not shown) and the gamma driver 600 to convert the input image received as a digital signal from the timing controller 200 into a gamma compensation voltage in each frame period, and may output the data voltage VDATA. The data driver 400 may be implemented with multiple source drive integrated circuits. The data driver 400 may be electrically connected to the data lines DLs of the display panel 100 through a chip on glass (COG) process or tape automated bonding (TAB) process.

The power driver 500 may output direct current power required to drive the pixel array of the display panel 100 and the drivers 300, 400, and 600 using a DC-DC converter. The power driver 500 may receive a direct current input voltage Vin and generate direct current voltages such as gate high voltage VGH, gate low voltage VGL, high-potential emission voltage EVDD, low-potential emission voltage EVSS, and high-potential reference voltage VDD.

Specifically, the gate high voltage VGH is a voltage set above the threshold voltage of transistors formed in the subpixels SPs. The gate high voltage VGH is output to the gate driver 300 and may be supplied to a level shifter within the gate driver 300.

The gate low voltage VGL is a voltage lower than the threshold voltage of transistors formed in the subpixels SPs. The gate low voltage VGL may be supplied to the level shifter within the gate driver 300.

The high-potential emission voltage EVDD is a voltage supplied to the anode electrode of a light emitting device and is a positive voltage that drives the light emitting device. The high-potential emission voltage EVDD may be supplied to a high-potential power line connected to each subpixel SP within the display panel 100.

The low-potential emission voltage EVSS is a voltage supplied to the cathode electrode of a light emitting device and is a negative voltage that drives the light emitting device. The low-potential emission voltage EVSS may be supplied to a low-potential power line connected to each subpixel SP within the display panel 100.

The high-potential reference voltage VDD is a voltage output to the gamma driver 600. The high-potential reference voltage VDD may be used as a reference for generating the gamma reference voltages GMAV1 to GMAV10.

The gamma driver 600 may receive a high-potential reference voltage VDD output from the power driver 500. The gamma driver 600 may receive the gamma control signal GMCS from the timing controller 200, generate the gamma reference voltage GMAV1 to GMAV10 having a value between the high-potential reference voltage VDD and a ground voltage (OV), and the data driver 400 may output a data voltage based on the gamma reference voltages GMAV1 to GMAV10.

Figure 2:
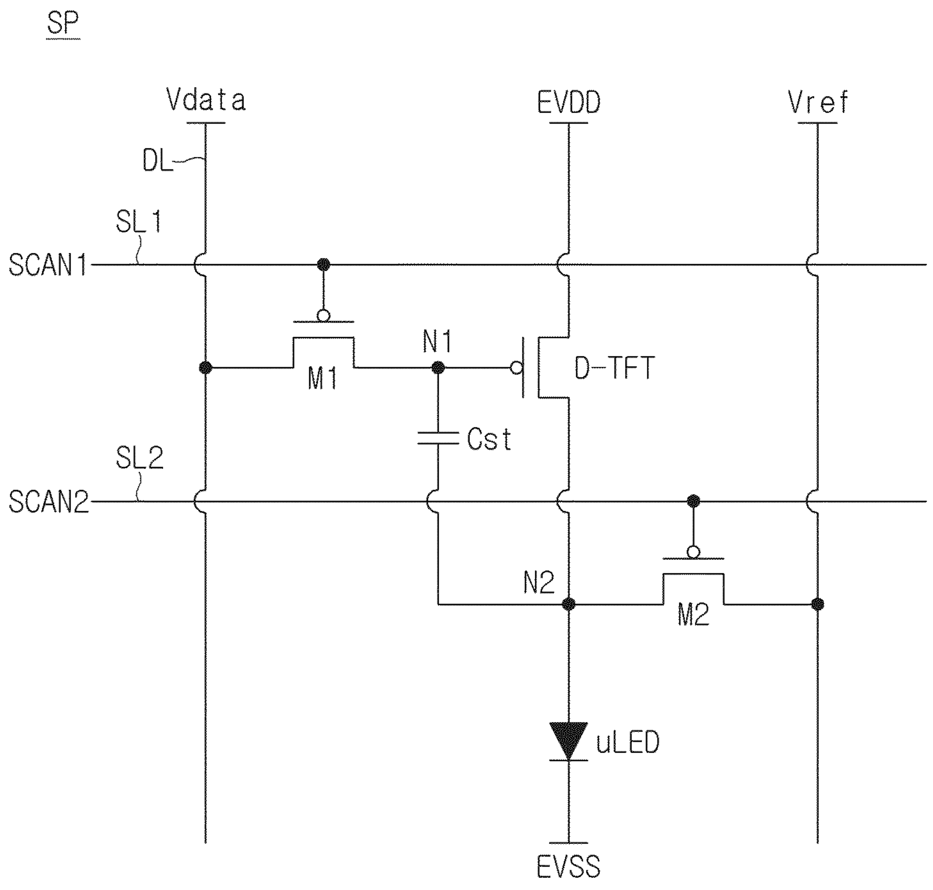
FIG. 2 is a circuit diagram showing a subpixel of a display apparatus according to embodiments of the present disclosure.

FIG. 2 is a circuit diagram showing a subpixel of a display apparatus according to embodiments of the present disclosure.

Referring to FIG. 2, the subpixel SP includes a micro-LED uLED, a driving transistor D-TFT, a storage capacitor Cst, a first transistor M1, and a second transistor M2.

The micro-LED uLED emits light depending on the driving current. The micro-LED uLED may include an anode electrode and a cathode electrode, the drain electrode of a driving transistor D-TFT may be connected to the anode electrode, and the low-potential light emission voltage EVSS may be connected to the cathode electrode.

The driving transistor D-TFT is coupled between the micro-LED uLED and the high-potential light emission voltage EVSS, and may control the driving current to make the micro LED uLED emit light according to the data voltage VDATA applied to the gate electrode. The driving transistor D-TFT may include a source electrode, a gate electrode, and a drain electrode. The gate electrode of the driving transistor D-TFT corresponds to a first node N1, and the drain electrode corresponds to the second node N2. The high-potential emission voltage EVDD may be connected to the source electrode of the driving transistor D-TFT.

The storage capacitor Cst may be connected between the gate electrode and drain electrode of the driving transistor D-TFT. The storage capacitor Cst may sample the data voltage VDATA when the first transistor M1 is turned on and may boost the gate electrode of the driving transistor D-TFT.

The first transistor M1 may be connected between the data line DL and the gate electrode of the driving transistor D-TFT. Additionally, the first transistor M1 may be connected between the data line DL and one electrode of the storage capacitor Cst.

The data voltage VDATA is applied to the data line DL, and the first transistor M1 may transmit the data voltage VDATA to the first node N1 in response to the first scan signal SCAN1 applied through the first scan line SL1.

The second transistor M2 is connected between the power line to which the reference voltage VREF is applied and the second node N2. The second transistor M2 may pre-charge the second node N2 with the reference voltage VREF in response to the second scan signal SCAN2 applied through the second scan line SL2.

Depending on the embodiment, the driving transistor D-TFT, the first transistor M1, and the second transistor M2 may be implemented as a low temperature polycrystalline oxide (LTPS) transistor or an oxide semiconductor transistor, but are not limited thereto. For example, the driving transistor D-TFT, the first transistor M1, and the second transistor M2 may be constituted with a P-type oxide thin film transistor or N-type oxide thin film transistor.

The subpixel SP according to one or more embodiments of the present disclosure is not limited thereto, and may include a transistor and a capacitor in addition to the micro-LED uLED, the driving transistor D-TFT, and the storage capacitor Cst.

Figure 3:
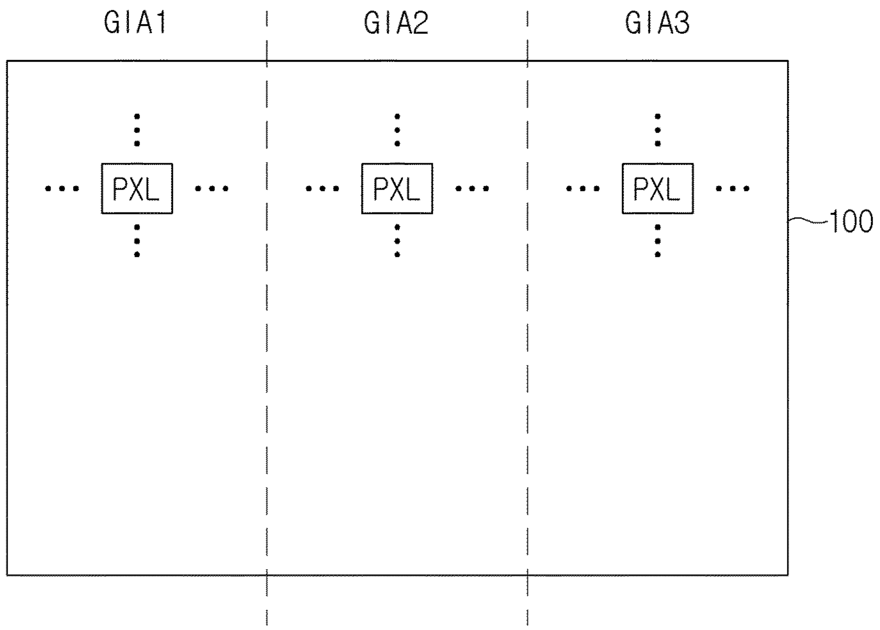
FIG. 3 is a block diagram showing a display panel according to an embodiment of the present disclosure.

FIG. 3 is a block diagram showing a display panel according to an embodiment of the present disclosure.

Referring to FIG. 3, the display panel 100 may include a first GIA region GIA1, a second GIA region GIA2, and a third GIA region GIA3. A plurality of pixel arrays PXLs may be disposed in each of the first GIA region GIA1, the second GIA region GIA2, and the third GIA region GIA3.

Referring to FIGS. 2 and 3, the pixel array PXL includes the subpixel SP shown in FIG. 2, and may include a GIA circuit that provides a scan signal to the scan line SL of the subpixel SP.

Figure 4:
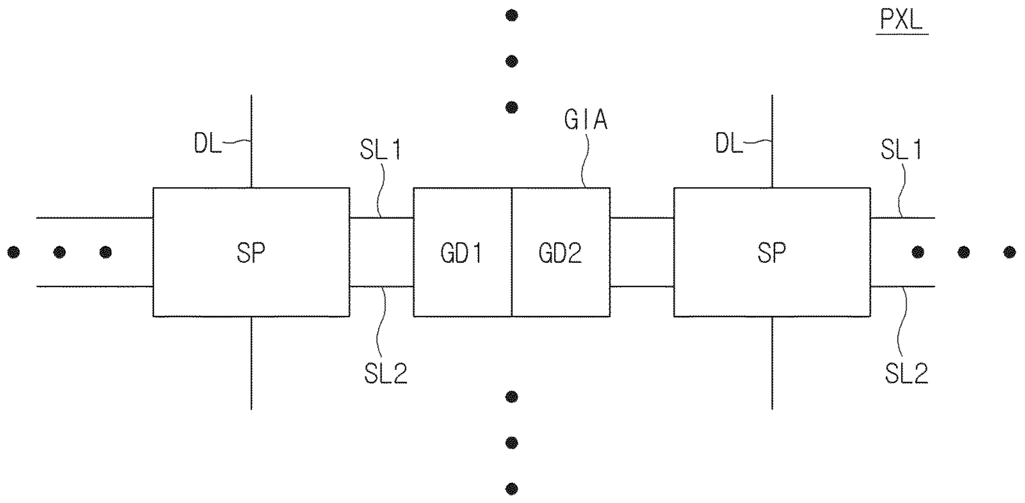
FIG. 4 is a block diagram showing a pixel array according to an embodiment of the present disclosure.

FIG. 4 is a block diagram showing a pixel array according to an embodiment of the present disclosure.

Referring to FIGS. 2 to 4, the plurality of pixel arrays PXLs may be disposed in each of the first GIA region GIA1, second GIA region GIA2, and third GIA region GIA3, and each of the plurality of pixels PXLs may include a subpixel SP and a GIA circuit.

For example, the GIA circuit may be disposed on the center line of each of the first region GIA1, second region GIA2, and third region GIA3, and a plurality of pixel circuits SPs may be disposed on both sides of the GIA circuit.

Referring to FIGS. 1 and 4, the subpixel SP may be connected to the data driver 400 through the data line DL. Additionally, the subpixel SP may be connected to the GIA circuit through the first scan line SL1 and second scan line SL2. Accordingly, the subpixel SP may receive the data voltage VDATA from the data driver 400 and the first scan signal SCAN1 and second scan signal SCAN2 from the GIA circuit.

Referring to FIG. 4, the GIA circuit may include two gate drivers GDs, i.e. a first gate driver GD1 and a second gate driver GD2.

Referring to FIGS. 2 and 4, the first gate driver GD1 may generate a first scan signal SCAN1 and transmit the first scan signal SCAN1 to the first transistor M1 of the subpixel SP. The first transistor M1 may provide the data voltage VDATA to the subpixel SP in response to the first scan signal SCAN1. Additionally, the second gate driver GD2 may generate a second scan signal SCAN2 and provide the second scan signal SCAN2 to the second transistor M2 of the subpixel SP. The second transistor M2 may provide a reference voltage VREF to the second node N2 in response to the second scan signal SCAN2.

Figure 5:
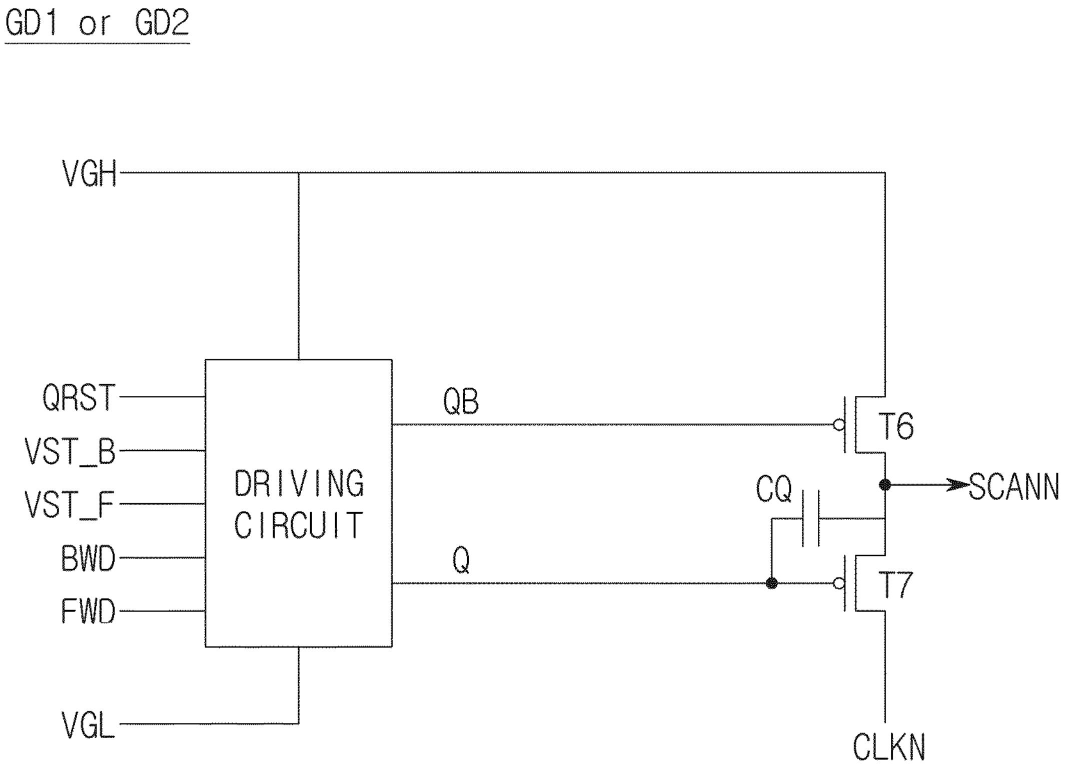
FIG. 5 is a block diagram showing a gate driver according to an embodiment of the present disclosure.

FIG. 5 is a block diagram showing a gate driver according to an embodiment of the present disclosure.

The gate driver may be the first gate driver GD1 that generates the first scan signal SCAN1 or the second gate driver GD2 that generates the second scan signal SCAN2.

Referring to FIG. 5, the gate driver GD may include a driving circuit, a transistor T6, and a transistor T7.

The driving circuit DRIVING CIRCUIT may charge or discharge the QB node or Q node using at least one of the gate high voltage VGH, gate low voltage VGL, front-stage voltage FWD, and rear-stage voltage BWD, in response to at least one of a global reset signal QRST, a forward start signal VST_F, and a reverse start signal VST_B.

The gate high voltage VGH may be connected to the source electrode of the transistor T6, and the N-th scan signal SCANN may be connected to the drain electrode. Additionally, a QB node may be connected to the gate electrode of the transistor T6. The transistor T6 may pull-up drive the N-th scan signal SCANN according to the signal of the QB node.

The N-th scan signal SCANN may be connected to the source electrode of the transistor T7, and the N-th clock signal CLKN may be connected to the drain electrode. Additionally, a Q node may be connected to the gate electrode of the transistor T7. The transistor T7 may pull-down drive the N-th scan signal SCANN according to the signal of the Q node.

Figure 6:
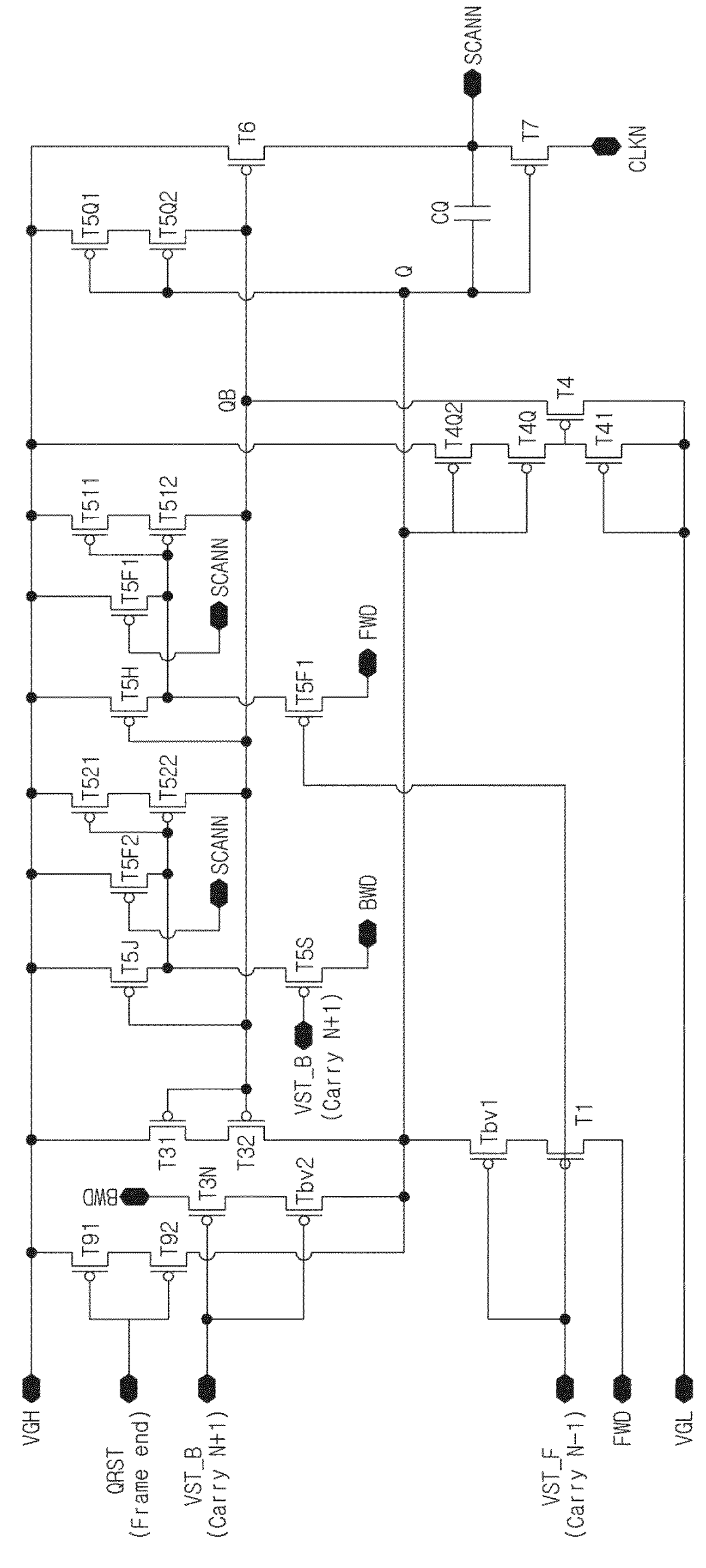
FIG. 6 is a circuit diagram showing a gate driver according to an embodiment of the present disclosure.

FIG. 6 is a circuit diagram showing a gate driver according to an embodiment of the present disclosure.

The gate driver may include a plurality of stage circuits, and each of the plurality of stage circuits may be configured as a circuit as shown in FIG. 6. The gate driver may be the first gate driver GD1 or the second gate driver GD2.

Referring to FIG. 6, the gate driver may include the transistor T6 and the transistor T7. In the transistor T6, the gate high voltage VGH is connected to the source electrode, the N-th scan signal SCANN is connected to the drain electrode, and the QB node is connected to the gate electrode. The transistor T6 may pull-up drive the N-th scan signal SCANN in response to the signal of the QB node. Here N may be 1 or 2.

In the transistor T7, the N-th scan signal SCANN is connected to the source electrode, the N-th clock signal CLKN is connected to the drain electrode, and the Q node is connected to the gate electrode. The transistor T7 may pull-down drive the N-th scan signal SCANN according to the N-th clock signal CLKN in response to the signal of the Q node. Here N may be 1 or 2.

The gate driver may further include a transistor T91 and a transistor T92. The transistors T91 and T92 may apply the gate high voltage VGH to the Q node according to the global reset signal QRST. The global reset signal QRST may be applied at each frame end of an image to initialize the Q node to the gate high voltage VGH.

In addition, the gate driver may further include a transistor T1 and a transistor Tbv1. When the gate driver is a first stage circuit among the plurality of stage circuits, the transistor T1 and transistor Tbv1 may apply the front-stage voltage FWD to the Q node in response to the forward start signal VST_F. Here, the front-stage voltage FWD may be set to the same level as the gate low voltage VGL.

The transistor T1 and transistor Tbv1 may discharge the Q node to the front-stage voltage FWD during forward operation. In this case, the transistor T7 may pull-down drive the N-th scan signal SCANN according to the N-th clock signal CLKN by discharging the Q node. Here, the forward operation may be defined as driving sequentially from the first stage circuit to the last stage circuit among a plurality of stage circuits.

When the gate driver is a second stage circuit or a last stage circuit among a plurality of stage circuits, the transistor T1 and transistor Tbv1 may transfer the front-stage voltage FWD to the Q node according to the N−1-th carry signal Carry N−1. Here, the N−1-th carry signal Carry N−1 may be a signal output from the previous stage circuit in a forward direction.

In addition, the gate driver may further include a transistor T3N and a transistor Tbv2. When the gate driver is the first stage circuit among the plurality of stage circuits, the transistor T3N and transistor Tbv2 may transfer the rear-stage voltage BWD to the Q node according to the reverse start signal VST_B. Here, the rear-stage voltage BWD may be set to the same level as the gate high voltage VGH.

When operating in the reverse direction, the transistors T3N and Tbv2 may charge the Q node with the rear-stage voltage BWD. In this case, the transistor T7 may pull-up drive the N-th scan signal SCANN according to the N-th clock signal CLKN by charging the Q node. Here, the reverse operation may be defined as driving sequentially from the last stage circuit to the first stage circuit among a plurality of stage circuits.

When the gate driver is the second stage circuit or first stage circuit from the last among a plurality of stage circuits, the transistors T3N and Tbv2 may transfer the rear-stage voltage BWD to the Q node according to the N+1-th carry signal Carry N+1. Here, the N+1-th carry signal Carry N+1 may be a signal output from the previous stage circuit in a reverse direction.

In addition, the gate driver may further include transistors T31 and T32. The transistors T31 and T32 may apply the gate high voltage VGH to the Q node according to the signal of the QB node.

The transistors T31 and T32 may turn off the transistor T7 by transferring the gate high voltage VGH to the Q node while the transistor T6 is turned on due to the discharge of the QB node.

In addition, the gate driver may further include transistors T4 and T41, and transistors T4Q and T4Q1. While the Q node is charged, the transistors T4 and T41 may turn on the transistor T6 by applying the gate low voltage VGL to the QB node according to the gate low voltage VGL.

While the transistor T7 is turned on due to the discharge of the Q node and applies the N-th clock signal CLKN to the N-th scan signal SCANN, the transistors T4Q and T4Q1 may turn off the transistor T6 to prevent the QB node from discharging.

In addition, the gate driver may further include a transistor T5S, transistors T511, T512, transistor T5F1, and transistor T5H. The transistor T5S, transistors T511, T512, transistor T5F1, and transistor T5H may control the signal of the QB node during the forward operation.

During the forward operation, the transistor T5S may apply the front-stage voltage FWD to the transistors T511 and T512 according to the forward start signal VST_F or N−1-th carry signal Carry N−1.

The transistors T511, T512 may apply the gate high voltage VGH to the QB node according to the front-stage voltage FWD, the transistor T5F1 may apply the gate high voltage VGH to the F node according to the N-th scan signal SCANN, and the transistor T5H may turn off the transistors T511, T512 according to the signal of the QB node.

In addition, the gate driver may further include a transistor T5N, transistors T521, T522, transistor T5F2, and transistor T5J. The transistor T5N, transistors T521, T522, transistor T5F2, and transistor T5J may control the signal of the QB node during the reverse operation.

During the reverse operation, the transistor T5N may apply the rear-stage voltage BWD to the transistors T521 and T522 according to the reverse start signal VST_B or N+1-th carry signal Carry N+1.

The transistors T521, T522 may apply the gate high voltage VGH to the QB node according to the rear-stage voltage BWD, the transistor T5F2 may apply the gate high voltage VGH to the B node according to the N-th scan signal SCANN, and the transistor T5J may turn off the transistors T521, T522 according to the signal of the QB node.

In addition, the gate driver may further include transistors T5Q1 and T5Q2. The transistors T5Q1 and T5Q2 may apply the gate high voltage VGH to the QB node in response to the signal of the Q node.

While the transistor T7 is turned on due to the discharge of the Q node and applies the N-th clock signal CLKN to the N-th scan signal SCANN, the transistors T5Q1 and T5Q2 may turn off the transistor T6 by applying the gate high voltage VGH to the QB node.

In addition, the gate driver may further include a stabilization capacitor CQ. The stabilization capacitor CQ is connected between the N-th scan signal SCANN and the Q node to stabilize the voltage level when the N-th scan signal SCANN is output.

Figure 7:
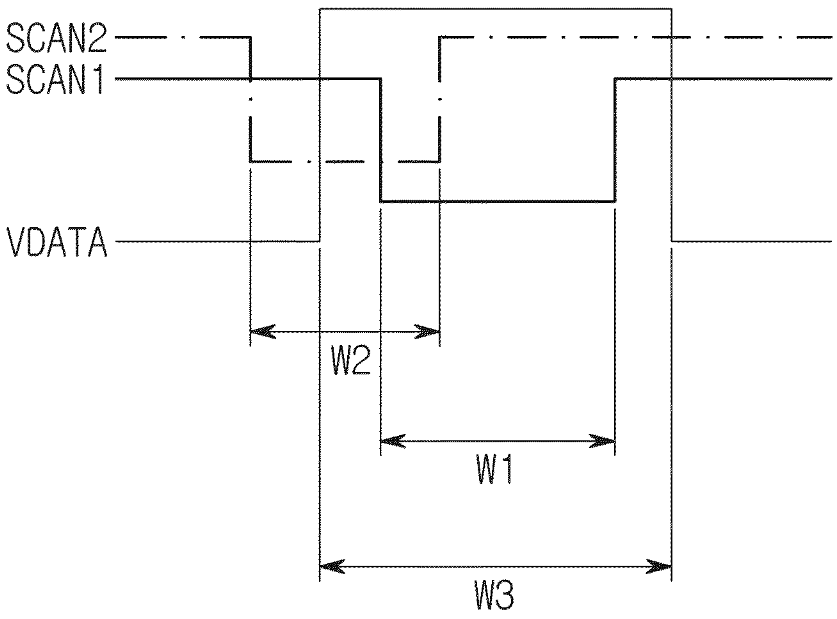
FIG. 7 is a timing diagram of a subpixel according to an embodiment of the present disclosure.

FIG. 7 is a timing diagram of a subpixel according to an embodiment of the present disclosure.

Referring to FIGS. 2 and 7, the subpixel SP first receives the second scan signal SCAN2 from the second gate driver GD2. In this case, the second transistor M2 of the subpixel SP may apply the reference voltage VREF to the second node N2 according to the second scan signal SCAN2. Next, the subpixel SP receives the data voltage VDATA from the data driver 400.

Thereafter, the subpixel SP receives the first scan signal SCAN1 from the first gate driver GD1. In this case, the first transistor M1 of the subpixel SP may apply the data voltage VDATA to the first node N1 according to the first scan signal SCAN1.

As a result, the storage capacitor Cst of the subpixel SP samples the data voltage VDATA, and the driving transistor D-TFT supplies a driving current corresponding to the voltage of the first node N1 to the micro-LED uLED to make the micro-LED uLED emit light.

Referring to FIG. 7, the pulse width W2 of the second scan signal SCAN2 may be set shorter than the pulse width W1 of the first scan signal SCAN1, and the pulse width W3 for applying the data voltage VDATA may be set to be longer than the pulse width W1 of the first scan signal SCAN1. That is, the pulse widths of the first scan signal W1, second scan signal W2, and data voltage VDATA may be set to W2<W1<W3.

Figure 8:
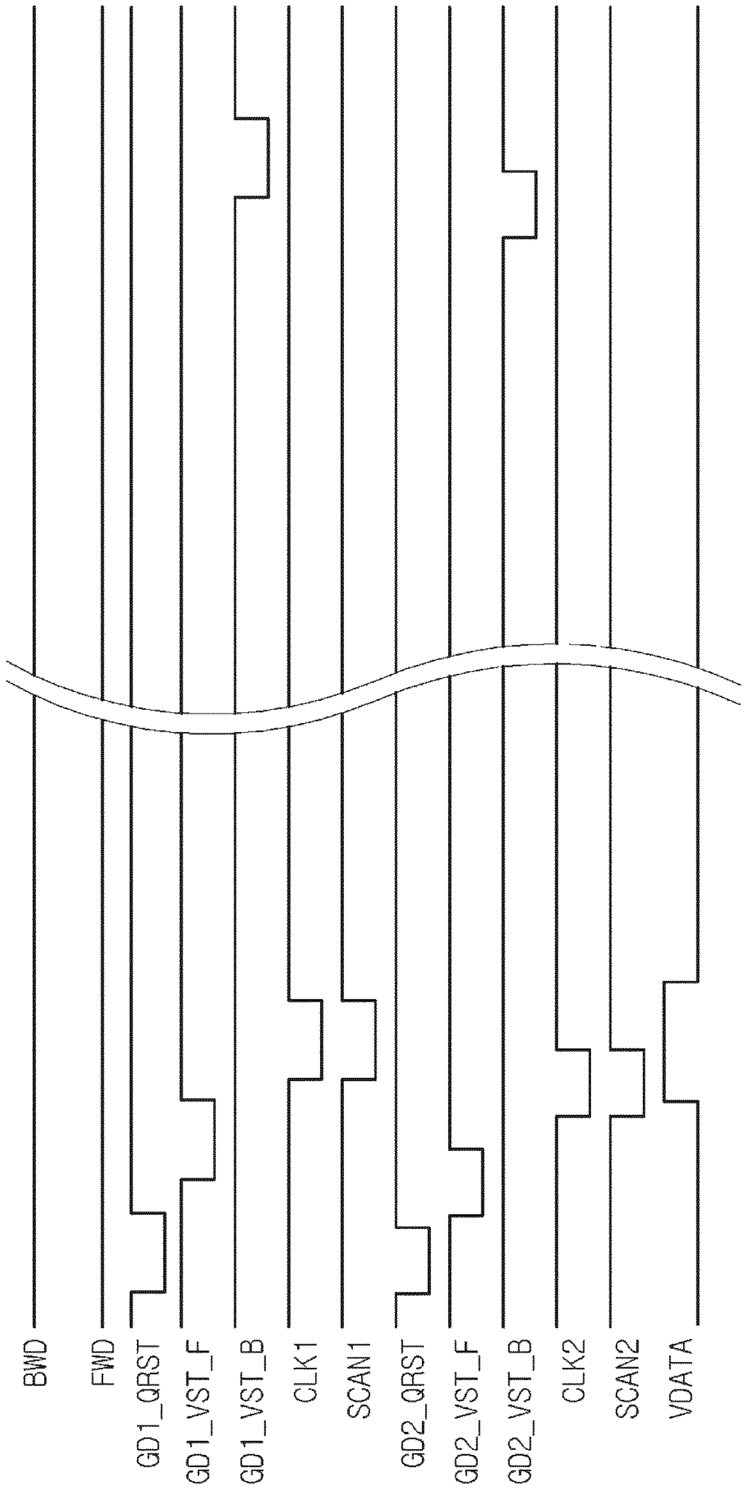
FIG. 8 is a timing diagram of a gate driver according to an embodiment of the present disclosure.

FIG. 8 is a timing diagram of a gate driver according to an embodiment of the present disclosure.

Referring to FIG. 8, during the forward operation, the front-stage voltage FWD may be set to the same level as the gate high voltage VGH, and the rear-stage voltage BWD may be set to the same level as the gate low voltage VGL.

The first gate driver GD1 may first initialize the QB node to the gate low voltage VGL and the Q node to the gate high voltage VGH according to a first global reset signal GD1_QRST.

Next, the first gate driver GD1 may start driving by charging the QB node with the front-stage voltage FWD and discharging the Q node to the rear-stage voltage BWD according to a first forward start signal GD1_VST_F. In this case, the first gate driver GD1 may output the first scan signal SCAN1 to the first scan line SL1 of the display panel 100 according to the first clock signal CLK1.

Lastly, the first gate driver GD1 may terminate the driving by discharging the QB node to the rear-stage voltage BWD and charging the Q node with the front-stage voltage FWD in response to the first reverse start signal GD1_VST_B.

The second gate driver GD2 may first initialize the QB node to the gate low voltage VGL and the Q node to the gate high voltage VGH according to a second global reset signal GD2_QRST.

Next, the second gate driver GD2 may start driving by charging the QB node with the front-stage voltage FWD and discharging the Q node to the rear-stage voltage BWD according to a second forward start signal GD2_VST_F. In this case, the second gate driver GD2 may output the second scan signal SCAN2 to the second scan line SL2 of the display panel 100 according to the second clock signal CLK2.

Lastly, the second gate driver GD2 may terminate the driving by discharging the QB node to the rear-stage voltage BWD and charging the Q node with the front-stage voltage FWD in response to a second reverse start signal GD2_VST_B.

Figure 9:
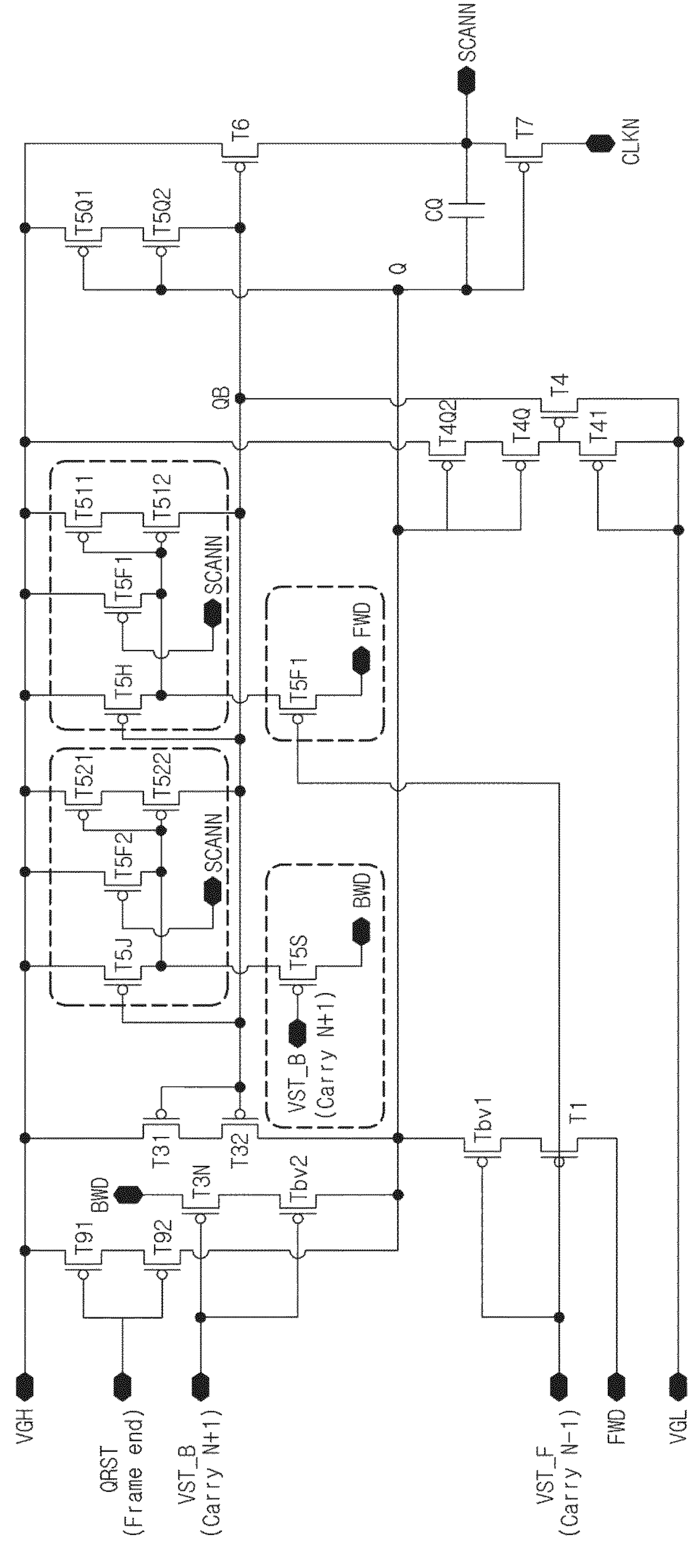
FIGS. 9, 10, and 11 are circuit diagrams showing gate drivers according to another embodiment of the present disclosure.
Figure 10:
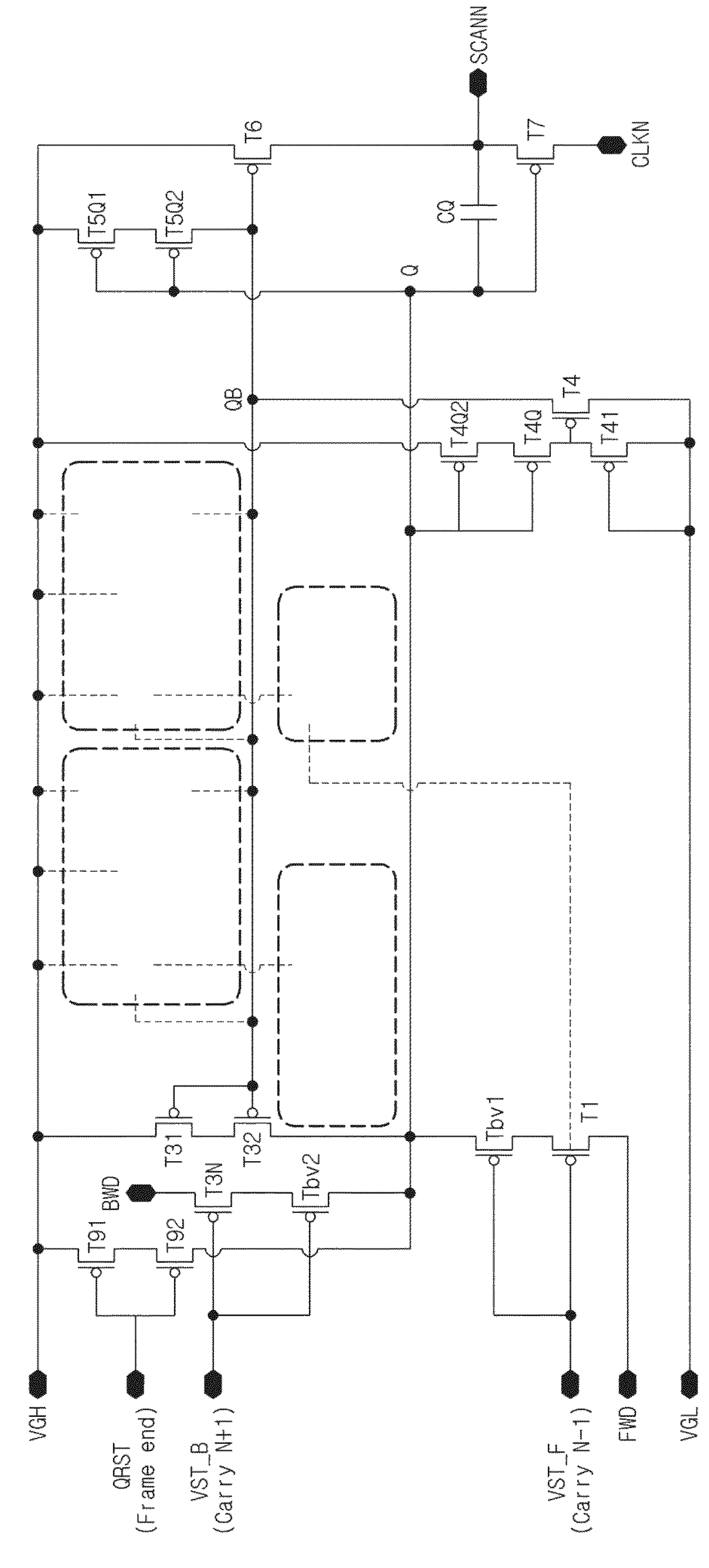
Figure 11:
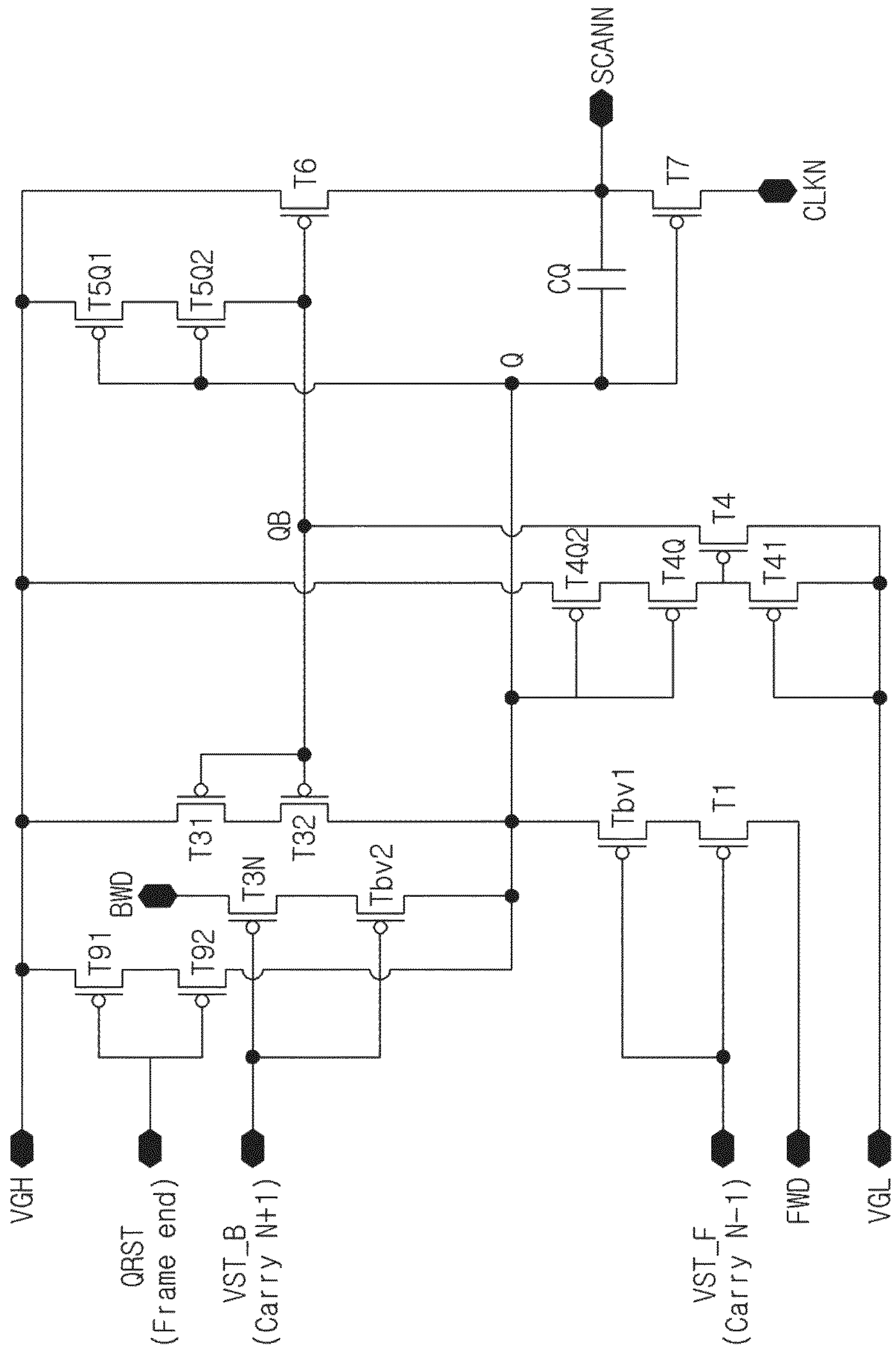

FIGS. 9, 10, and 11 are circuit diagrams showing gate drivers according to another embodiment of the present disclosure.

Referring to FIG. 9, the transistor T5S, transistors T511 and T512, transistor T5F1, and transistor T5H may control the signal of the QB node during the forward operation, and the transistor T5N, transistors T521 and T522, transistor T5F2, and transistor T5J may control the signal of the QB node during the reverse operation.

Referring to FIGS. 10 and 11, the transistor T5S, transistors T511 and T512, transistor T5F1, and transistor T5H may be deleted. If among the transistors T1 and Tbv1 and transistors T5S, T511, T512, T5F1, and T5H that use the forward start signal VST_F, the transistors T5S, T511, T512, T5F1, and T5H are deleted, the design of the gate driver can be simplified.

The transistor T5N, transistors T521 and T522, transistor T5F2, and transistor T5J may be deleted. If among the transistors T3N and Tbv2 and the transistors T5N, T521, T522, T5F2, and T5J that use the reverse start signal VST_B, the transistors T5N, T521, T522, T5F2, and T5J are deleted, the design of the gate driver can be simplified.

Referring to FIG. 11, the gate driver may include a transistor T6 and a transistor T7. In the transistor T6, a source electrode is connected to the gate high voltage VGH, a drain electrode is connected to the N-th scan signal SCANN, and a gate electrode is connected to the QB node. The transistor T6 may pull-up drive the N-th scan signal SCANN in response to the signal of the QB node. Here N may be 1 or 2.

In the transistor T7, a source electrode is connected to the N-th scan signal SCANN, a drain electrode is connected to the N-th clock signal CLKN, and a gate electrode is connected to the Q node. The transistor T7 may pull-down drive the N-th scan signal SCANN according to the N-th scan signal SCANN in response to the signal of the Q node. Here N may be 1 or 2.

The gate driver may further include a transistor T91 and a transistor T92. The transistors T91 and T92 may apply the gate high voltage VGH to the Q node according to the global reset signal QRST. The global reset signal QRST may be applied at each frame end of an image to initialize the Q node to the gate high voltage VGH.

In addition, the gate driver may further include a transistor T1 and a transistor Tbv1. When the gate driver is a first stage circuit among a plurality of stage circuits, the transistor T1 and transistor Tbv1 may apply the front-stage voltage FWD to the Q node in response to the forward start signal VST_F. Here, the front-stage voltage FWD may be set to the same level as the gate low voltage VGL.

The transistor T1 and transistor Tbv1 may discharge the Q node to the front-stage voltage FWD during the forward operation. In this case, the transistor T7 may pull-down drive the N-th scan signal SCANN according to the N-th clock signal CLKN by discharging the Q node. Here, the forward operation may be defined as driving sequentially from the first stage circuit to the last stage circuit among a plurality of stage circuits.

When the gate driver is a second stage circuit or a last stage circuit among a plurality of stage circuits, the transistors T1 and Tbv1 may apply the front-stage voltage FWD to the Q node according to the N−1-th carry signal Carry N−1. Here, the N−1th carry signal Carry N−1 may be a signal output from the previous stage circuit in a forward direction.

In addition, the gate driver may further include a transistor T3N and a transistor Tbv2. When the gate driver is the first stage circuit among the plurality of stage circuits, the transistors T3N and Tbv2 may apply the rear-stage voltage BWD to the Q node according to the reverse start signal VST_B. Here, the rear-stage voltage BWD may be set to the same level as the gate high voltage VGH.

When operating in the reverse direction, the transistors T3N and Tbv2 may charge the Q node with the rear-stage voltage BWD. In this case, the transistor T7 may pull-up drive the N-th scan signal SCANN according to the N-th clock signal CLKN by charging the Q node. Here, the reverse operation may be defined as driving sequentially from the last stage circuit to the first stage circuit among a plurality of stage circuits.

When the gate driver is the second stage circuit or first stage circuit from the last among a plurality of stage circuits, the transistors T3N and Tbv2 may apply the front-stage voltage FWD to the Q node according to the N+1-th carry signal Carry N+1. Here, the N+1-th carry signal Carry N+1 may be a signal output from the previous stage circuit in a reverse direction.

In addition, the gate driver may further include transistors T31 and T32. The transistors T31 and T32 may apply the gate high voltage VGH to the Q node according to the signal of the QB node.

The transistors T31 and T32 may turn off the transistor T7 by transferring the gate high voltage VGH to the Q node while the transistor T6 is turned on due to the discharge of the QB node.

In addition, the gate driver may further include transistors T4 and T41 and transistors T4Q and T4Q1. While the Q node is charged, the transistors T4 and T41 may turn on the transistor T6 by applying the gate low voltage VGL to the QB node according to the gate low voltage VGL.

While the transistor T7 is turned on due to the discharge of the Q node and applies the N-th clock signal CLKN to the N-th scan signal SCANN, the transistors T4Q and T4Q1 may turn off the transistor T6 to prevent the QB node from discharging.

In addition, the gate driver may further include a transistor T5Q1 and T5Q2. The transistors T5Q1 and T5Q2 may apply the gate high voltage VGH to the QB node in response to the signal of the Q node.

While the transistor T7 is turned on due to the discharge of the Q node and applies the N-th clock signal CLKN to the N-th scan signal SCANN, the transistors T5Q1 and T5Q2 may prevent the turn-on of the transistor T6 by applying the gate high voltage VGH to the QB node.

In addition, the gate driver may further include a stabilization capacitor CQ. The stabilization capacitor CQ is connected between the N-th scan signal SCANN and the Q node to stabilize the voltage level when outputting the N-th scan signal SCANN.

Figure 12:
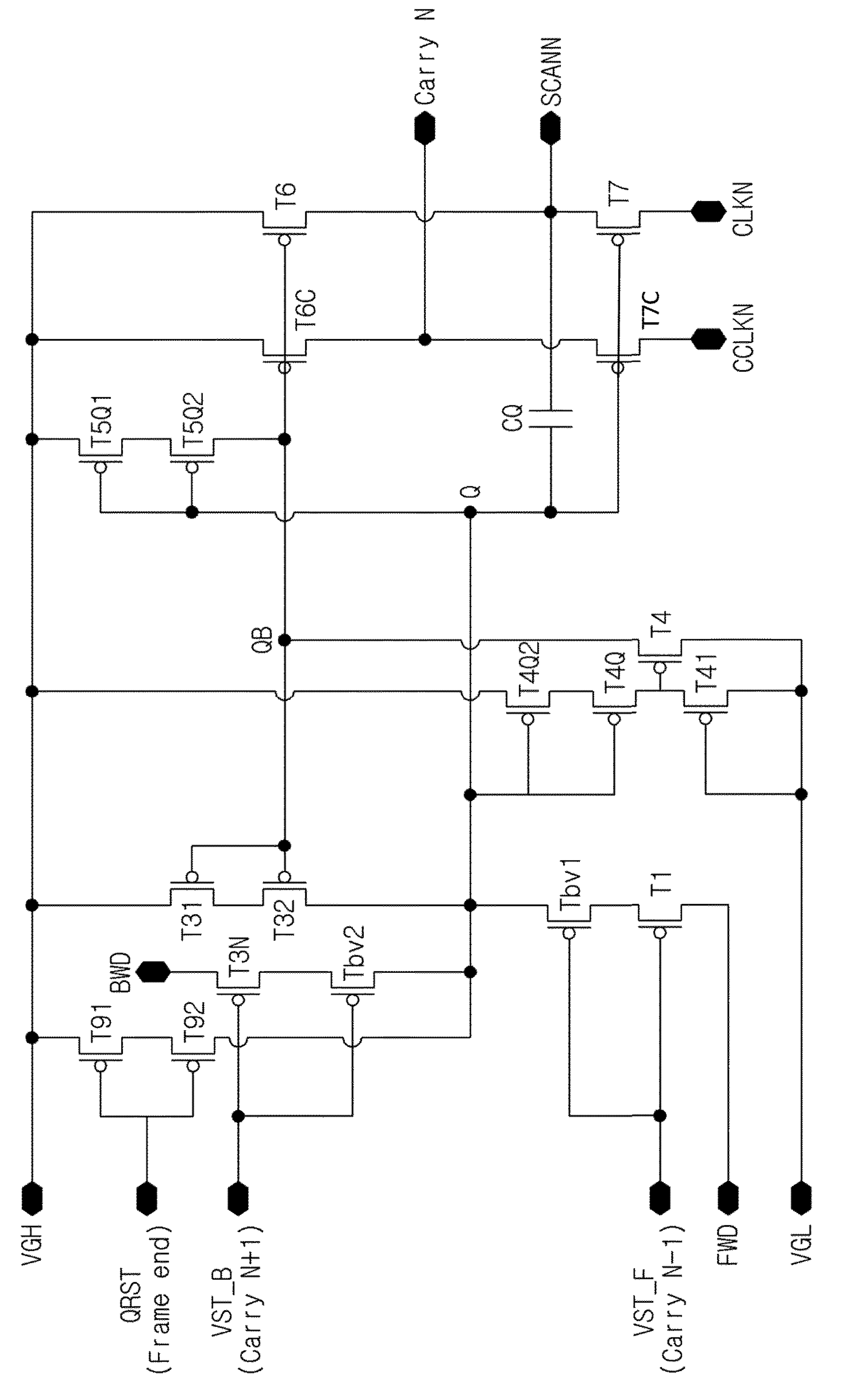
FIG. 12 is a circuit diagram showing a gate driver according to another embodiment of the present disclosure.

FIG. 12 is a circuit diagram showing a gate driver according to another embodiment of the present disclosure.

Referring to FIG. 12, the gate driver GD may further include transistors T6C and T7C.

In the transistor T6C, a source electrode may be connected to the gate high voltage VGH, a drain electrode may be connected to the N-th carry signal Carry N. In addition, the QB node may be connected to the gate electrode of the transistor T6C. The transistor T6C may pull-up drive the N-th carry signal Carry N according to the signal of the QB node.

The N-th carry signal Carry N may be connected to the source electrode of the transistor T7C, and the N-th carry clock signal CCLKN may be connected to the drain electrode. In addition, the Q node may be connected to the gate electrode of the transistor T7C. The transistor T7C may pull-down drive the N-th scan signal SCANN according to the signal of the Q node.

Referring to FIGS. 11 and 12, the output of the gate driver GD may be separated into the N-th scan signal SCANN and the N-th carry signal Carry N. If the N-th scan signal SCANN and N-th carry signal Carry N are output separately, the transistors T1 and Tbv1 may improve pre-charging of the Q node. In addition, if the N-th scan signal SCANN and N-th carry signal Carry N are output separately, the transistors T3N and Tbv2 may improve discharging of the Q node.

The above description and the accompanying drawings provide an example of the technical idea of the present disclosure for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present disclosure intended to illustrate the scope of the technical idea of the present disclosure, and the scope of the present disclosure is not limited by the embodiments. The scope of the present disclosure shall be construed on the basis of the accompanying claims in such a manner that all of the technical ideas included within the scope equivalent to the claims belong to the present disclosure.

The micro-LED display apparatus according to embodiments can stably drive a gate driver within a GIA circuit.

What is claimed is:

1. A micro-LED display apparatus, comprising:

a timing controller configured to output image data;

a display panel including a plurality of pixel arrays that are connected to a data line; and a data driver configured to generate a data voltage based on the image data and apply the data voltage to the data line, wherein a pixel array of the plurality of pixel arrays comprises a gate in array (GIA) circuit that provides a scan signal to a subpixel of the pixel array, and wherein the GIA circuit comprises:

a first transistor including a gate electrode connected to a QB node of the GIA circuit, a source electrode that receives a gate high voltage, and a drain electrode that outputs an N-th carry signal;

a second transistor including a gate electrode connected to a Q node of the GIA circuit, a source electrode that outputs the N-th carry signal, and a drain electrode that receives an N-th carry clock signal;

a third transistor including a gate electrode connected to the same QB node as the gate electrode of the first transistor, a source electrode that receives the gate high voltage, and a drain electrode that outputs an N-th scan signal;

a fourth transistor including a gate electrode connected to the same Q node as the gate electrode of the second transistor, a source electrode that outputs the N-th scan signal, and a drain electrode that receives an N-th clock signal;

a first gate driver configured to provide a first scan signal to the subpixel; and a second gate driver configured to provide a second scan signal to the subpixel, wherein a pulse width of the second scan signal is shorter than a pulse width of the first scan signal, and wherein a pulse width of a data voltage signal representing the data voltage is longer than the pulse width of the first scan signal.

2. The micro-LED display apparatus of claim 1, wherein the display panel includes a first GIA region, a second GIA region, and a third GIA region.

3. The micro-LED display apparatus of claim 1, wherein the first gate driver and the second gate driver further comprise a capacitor that receives the N-th scan signal and is connected to the Q node.

4. The micro-LED display apparatus of claim 1, wherein the N-th carry signal is a same as the N-th scan signal, and wherein the N-th carry clock signal is a same as the N-th clock signal.

5. A gate driving circuit, comprising:

a gate in array (GIA) circuit configured to provide a scan signal to a subpixel, the GIA circuit comprising:

a first transistor including a gate electrode connected to a QB node of the GIA circuit, a source electrode that receives a gate high voltage, and a drain electrode that outputs an N-th carry signal;

a second transistor including a gate electrode connected to a Q node of the GIA circuit, a source electrode that outputs the N-th carry signal, and a drain electrode that receives an N-th carry clock signal;

a third transistor including a gate electrode connected to the same QB node as the gate electrode of the first transistor, a source electrode that receives the gate high voltage, and a drain electrode that outputs an N-th scan signal;

a fourth transistor including a gate electrode connected to the same Q node as the gate electrode of the second transistor, a source electrode that outputs the N-th scan signal, and a drain electrode that receives an N-th clock signal;

a first gate driver configured to provide a first scan signal to the subpixel; and a second gate driver configured to provide a second scan signal to the subpixel, wherein a pulse width of the second scan signal is shorter than a pulse width of the first scan signal, and wherein a pulse width of a data voltage is longer than the pulse width of the first scan signal.

6. The gate driving circuit of claim 5, wherein the GIA circuit is on a first GIA region, a second GIA region, and a third GIA region of a display panel.

7. The gate driving circuit of claim 5, wherein the first gate driver and the second gate driver further comprise a capacitor that receives the N-th scan signal and is connected to the Q node.

8. The gate driving circuit of claim 5, wherein the N-th carry signal is a same as the N-th scan signal, and wherein the N-th carry clock signal is the same as the N-th clock signal.

* * * * *